United States Patent
Waldman

(10) Patent No.: US 9,488,488 B2
(45) Date of Patent: Nov. 8, 2016

(54) AUGMENTED REALITY MAPS

(75) Inventor: Jaron Waldman, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 743 days.

(21) Appl. No.: 12/705,558

(22) Filed: Feb. 12, 2010

(65) Prior Publication Data

US 2011/0199479 A1 Aug. 18, 2011

(51) Int. Cl.
*G01C 21/36* (2006.01)

(52) U.S. Cl.
CPC ....... *G01C 21/3647* (2013.01); *G01C 21/3602* (2013.01); *G01C 21/3679* (2013.01)

(58) Field of Classification Search
CPC .......... G01C 21/3602; G01C 21/3647; G01C 21/3679
USPC ....................................................... 348/116
See application file for complete search history.

(56) References Cited

U.S. PATENT DOCUMENTS

| | | | |
|---|---|---|---|
| 7,557,736 B1 | 7/2009 | Daily et al. | |
| 8,239,130 B1* | 8/2012 | Upstill ............... | G01C 21/3679 701/400 |
| 2008/0134088 A1* | 6/2008 | Tse et al. ...................... | 715/810 |
| 2008/0268876 A1* | 10/2008 | Gelfand et al. ............... | 455/457 |
| 2009/0216446 A1 | 8/2009 | Ma et al. | |
| 2010/0070162 A1* | 3/2010 | Aihara ............... | G01C 21/3632 701/533 |
| 2010/0245561 A1 | 9/2010 | Yamaguchi et al. | |
| 2011/0074671 A1* | 3/2011 | Shimosato et al. ........... | 345/156 |
| 2011/0141254 A1* | 6/2011 | Roebke et al. ................ | 348/61 |

FOREIGN PATENT DOCUMENTS

| | | |
|---|---|---|
| DE | 102006056874 A1 | 6/2008 |
| JP | 2007228100 A * | 9/2007 |
| JP | 2009058439 A * | 3/2009 |
| WO | WO 2005124594 A1 * | 12/2005 |
| WO | 2006132522 A1 | 12/2006 |
| WO | WO 2006132522 A1 * | 12/2006 |

(Continued)

OTHER PUBLICATIONS

Livingston, M. et al.; ("Resolving Multiple Occluded Layers in Augmented Reality"; Proceedings of the Second IEEE and ACM International Symposium on Mixed and Augmented Reality; Oct. 7-10, 2003; pp. 56-65).*

(Continued)

*Primary Examiner* — Behrooz Senfi
*Assistant Examiner* — Maria Vazquez Colon
(74) *Attorney, Agent, or Firm* — Kilpatrick Townsend & Stockton LLP

(57) ABSTRACT

A user points a handheld communication device to capture and display a real-time video stream. The handheld communication device detects geographic position, camera direction, and tilt of the image capture device. The user sends a search request to a server for nearby points of interest. The handheld communication device receives search results based on the search request, geographic position, camera direction, and tilt of the handheld communication device. The handheld communication device visually augments the captured video stream with data related to each point of interest. The user then selects a point of interest to visit. The handheld communication device visually augments the captured video stream with a directional map to a selected point of interest in response to the user input.

29 Claims, 6 Drawing Sheets

(56) References Cited

FOREIGN PATENT DOCUMENTS

| WO | 2008152784 A1 | 12/2008 |
| WO | 2009084133 A1 | 7/2009 |

OTHER PUBLICATIONS

Güven et al. ("Visualizing and navigating complex situated hypermedia in augmented and virtual reality," Mixed and Augmented Reality, 2006. ISMAR 2006. IEEE/ACM International Symposium on , vol., no., pp. 155,158, Oct. 22-25, 2006.).*

Hollerer, Tobias, et al. "User interface management techniques for collaborative mobile augmented reality." Computers & Graphics 25.5 (2001): 799-810).*

"International Search Report and Written Opinion mailed Jun. 1, 2011 for PCT/US2011/024508 (Pub No. WO 2011/100535) titled "Augmented Reality Maps," to Apple Inc.".

Scott Stein, "Augmented reality: iPhone 3G S killer app?" www.cnet.com, Jun. 17, 2009 (Available online at http://news.cnet.com/8301-17938_105-10266380-1.html, last visited Dec. 14, 2009).

Zee, "Introducing twitter's first augmented reality iPhone app with geo-tagging built in." www.thenextweb.com, Dec. 1, 2009 (Available online at http://thenextweb.com/applicious/2009/12/01/introducing-augmented-reality-twitter-iphone-app-geotagging-built/, last visited Dec. 14, 2009).

International Preliminary Report on Patentability for International PCT Application No. PCT/US2011/024508, mailed Aug. 14, 2012, 9 pages.

* cited by examiner

AUGMENTED REALITY MAPS

FIELD

The following relates to searching for nearby points of interest, and more particularly to displaying information related to nearby points of interest overlaid onto a video feed of a surrounding area.

BACKGROUND

Augmented reality systems supplement reality, in the form of a captured image or video stream, with additional information. In many cases, such systems take advantage of a portable electronic device's imaging and display capabilities and combine a video feed with data describing objects in the video. In some examples, the data describing the objects in the video can be the result of a search for nearby points of interest.

For example, a user visiting a foreign city can point a handheld communication device and capture a video stream of a particular view. A user can also enter a search term, such as museums. The system can then augment the captured video stream with search term result information related to nearby museums that are within the view of the video stream. This allows a user to supplement their view of reality with additional information available from search engines.

However, if a user desires to visit one of the museums, the user must switch applications, or at a minimum, switch out of an augmented reality view to learn directions to the museum. However, such systems can fail to orient a user's with a poor sense of direction and force the user to correlate the directions with objects in reality. Such a transition is not always as easy as it might seem. For example, an instruction that directs a user to go north on Main St. assumes that the user can discern which direction is north. Further, in some instances, street signs might be missing or indecipherable, making it difficult for the user to find the directed route.

SUMMARY

Such challenges can be overcome using the present technology. Therefore, a method and system for displaying augmented reality maps are disclosed. By interpreting the data describing the surrounding areas, the device can determine what objects are presently being viewed on the display. The device can further overlay information regarding the presently viewed objects, thus enhancing reality. In some embodiments, the device can also display search results overlaid onto the displayed video feed. Search results need not be actually viewable by a user in real life. Instead, search results can also include more-distant objects.

The user can interact with the display using an input device such as a touch screen. Using the input device, the user can select from among objects represented on the screen, including the search results.

In one form of interaction, a device can receive an input from the user requesting directions from a present location to a selected search result. Directions can be overlaid onto the presently displayed video feed, thus showing a course and upcoming turns. As the user and associated device progress along a route, the overlaid directions can automatically update to show the updated path.

In some embodiments the display can also include indicator graphics to point the user in a proper direction. For example, if the user is facing south but a route requires the user to progress north, "no route" would be displayed in the display because the user would be looking to the south but the route would be behind him or her. In such instances, an indicator can point the user in the proper direction to find the route.

In some embodiments, multiple display views can be presented based on the orientation of the device. For example, when the device is held at an angle with respect to the ground of 45 degrees to 180 degrees, the display view can present the augmented reality embodiments described herein. However, when the device is held at an angle less than 45 degrees, an illustrated or schematic view can be represented. In such embodiments, when the device is held at an angle with respect to the ground of less than 45 degrees, the device is likely pointed at the ground, where few objects of interest are likely to be represented in the displayed video. In such instances, a different map view is more likely to be useful. It should be appreciated that precise range of tilt can be adjusted according the actual environment or user preferences.

In practice, a user points a handheld communication device to capture and display a real-time video stream of a view. The handheld communication device detects a geographic position, camera direction, and tilt of the image capture device. The user sends a search request to a server for nearby points of interest. The handheld communication device receives search results based on the search request, geographic position, camera direction, and tilt of the handheld communication device. The handheld communication device visually augments the captured video stream with data related to each point of interest. The user then selects a point of interest to visit. The handheld communication device visually augments the captured video stream with a directional map to a selected point of interest in response to the user input.

A method of augmenting a video stream of a device's present surrounding with navigational information is disclosed. The user can instruct the device to initiate a live video feed using an onboard camera and display the captured video images on a display. By polling a Global Positioning System (GPS) device, a digital compass, and optionally, an accelerometer, location, camera direction, and orientation information can be determined. By using the location, camera direction, and orientation information, the device can request data describing the surrounding areas and the objects therein. In some embodiments, this data includes map vector data. The can be requested from an onboard memory or a server. The data describing surrounding areas can further be requested in conjunction with a search request. The search request can also include a request for information about nearby places of interest.

DESCRIPTION

The technology described herein visually augments a captured image or video stream with data for points of interest related to search terms entered by the user. The technology also visually augments the captured image or video stream with a directional map to a selected point of interest.

Figure 1:
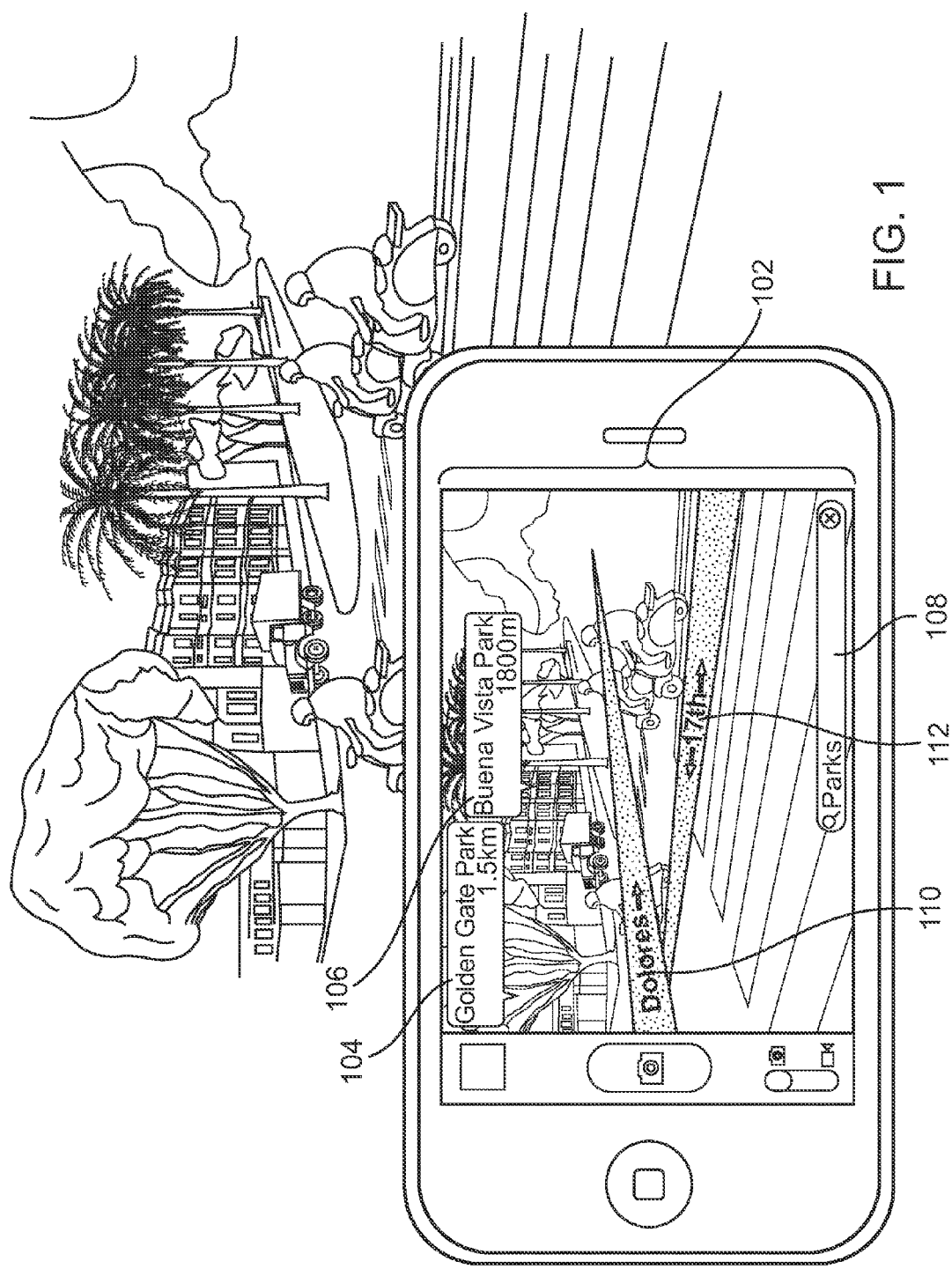
FIG. 1 illustrates an exemplary visually augmented captured image with data related to a search for points of interest.

FIG. 1 is a screenshot illustrating an augmented reality embodiment as described herein. As illustrated, a handheld communication device has captured an image 102 of the northwest corner of the intersection of Dolores St and $17^{th}$ St. using its image-capturing device and displayed the image on its display. In this way, the display can function as a viewfinder. As illustrated, the captured image 102 has been augmented with information corresponding to points of interest 104, 106 and street labels 110, 112.

FIG. 1 illustrates a captured and presented image 102 using an image capture device, i.e., the camera of a smart phone, which is but one type of handheld communication device to which the present disclosure can be applied. In this illustrated embodiment, the user has entered a search term "parks" in search bar 108 to conduct a search for nearby parks, i.e., a specific type of point of interest. Using map data that describes the area surrounding the present location of the device and the points of interest located in the surrounding area, the device augments the displayed image with additional information. In this instance, the smart phone or handheld communication device displays points of interest described by the data that are displayed in the viewfinder (such as Dolores St. 110 and $17^{th}$ St. 112) or within a field of view and range from the geographic position of the device but that are obstructed by other in-screen objects, e.g., Golden Gate Park 104 and Buena Vista Park 106. While other parks might also be nearby, they are not shown because they fall outside the field of view of the device. However, the user could locate these parks by panning the device around the intersection, in which case those parks would appear on the screen.

In the captured image 102, the handheld communication device augments the captured image with bubbles showing the relative geographic position of "Golden Gate Park" 104 and "Buena Vista Park" 106 within the captured image 102. This allows the user to determine a general direction to a point of interest. A user can then select a point of interest, e.g., by selecting the "Buena Vista Park" 106 point of interest information bubble, e.g., by touching the point of interest information bubble with a finger or stylus if the smart phone employs a touch screen. In other implementations, a cursor and mouse can be used to select a desired point of interest.

Points of interest can be any map feature, but most often a point of interest can be a map feature that identified as result of a search for a category of such map features. For example, a point of interest can be a park when a user searches for nearby parks. Likewise a point of interest can be places, buildings, structures, even friends that can be located on a map, when the point of interest is searched for. In some instances a point of interest is not necessarily identified as a result of a search. A point of interest can also be a map feature that is identified by the present system because it can be viewed in the captured image. In short, a point of interest can be any map feature for which the user has an interest.

Figure 2:
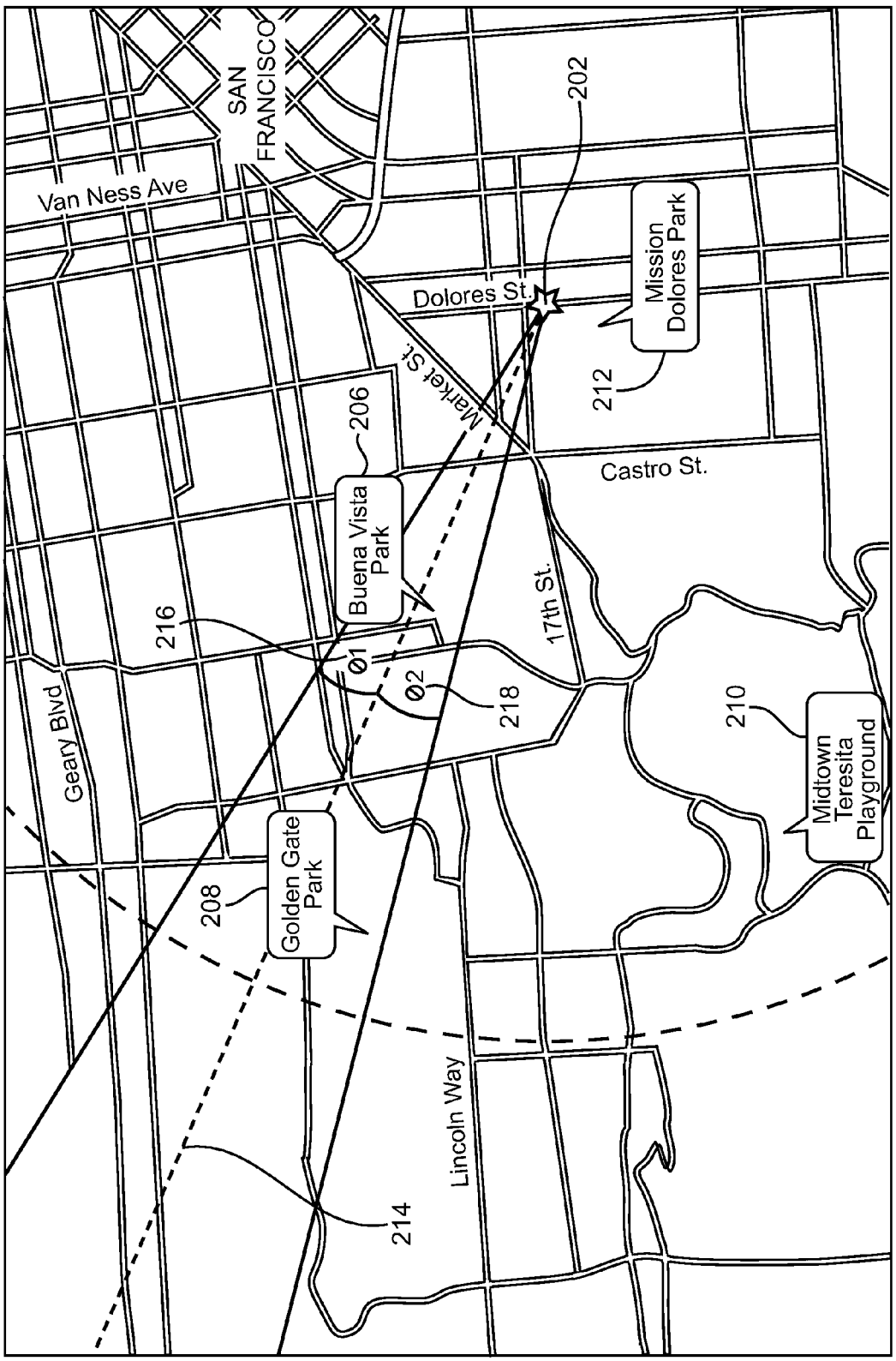
FIG. 2 illustrates a the results of a field-of-view and point-of-interest search.

FIG. 2 illustrates search results for point of interest results for nearby parks based on geographic position and also illustrates how a range and field of view correspond to the results displayed in the viewfinder. A handheld communication device captures a video stream of the view as shown in FIG. 1. The handheld communication device detects the geographic position, camera direction, and tilt of the handheld communication device.

The geographic position of the handheld communication device can be determined using GPS coordinates or using triangulation methods using cell phone towers. In yet another example, a blend of GPS coordinates and triangulation information can be used to determine the position of the device.

The camera direction is a direction relative to a planet's magnetic field (i.e., Earth's magnetic field) in which the camera is pointing. The camera direction can be considered a direction that can be identified using a compass, such as a digital compass. The camera direction can be used to identify the direction in which the camera is pointing as it acquires an image to be augmented using the present technology.

The tilt direction is a direction that determines the direction in which either the camera device or display device is pointing relative to a horizontal or vertical axis. The tilt direction can most commonly be determined using an accelerometer.

The user can enter a search request for nearby points of interest based on a search term. In this example, upon entry by the user of a search for nearby "Parks" the handheld communication device sends a request for data related to nearby parks to a map database.

Either the request itself, or the database being queried can determine a relevant range from within which search results must be encompassed. Upon receipt of the request, the database will return search results for points of interest related to the search term that are also within a defined radius of the handheld communication device as illustrated in FIG. 2. As shown in this example, the server returned points of interest "Golden Gate Park" 208, "Buena Vista Park" 206, "Midtown Terrace Playground" 210, and "Mission Dolores Park" 212. The handheld communication device determines that of the point-of-interest search results, only "Golden Gate Park" 208 and "Buena Vista Park" 206 are within the field of view of the handheld communication device. The point-of-interest results "Golden Gate Park" 208 and "Buena Vista Park" 206 are displayed with their relative spatial relationship to the handheld communication device. In the example shown in FIG. 2, the camera direction of the handheld communication device is northwest.

A field of view can be determined using a digital compass to inform the device of the camera direction in which the camera is facing or, alternatively, the user could enter in a heading. As explained above, in FIGS. 1 and 2, the camera is facing northwest and its theoretical line of sight is represented as 214 in FIG. 2. Any search results that are to be displayed on the viewfinder must be within a certain angle of line 214. For example, a camera on a handheld communication device might only be able to display range of view encompassing 30 degrees. In such an instance, a given display would represent those items encompassed within 15 degrees in each direction from the center of the field of view. This concept is illustrated in FIG. 2 wherein 214 illustrates the center of the field of view and angles $\theta_1$ 216=$\theta_2$ 218 and they represent angles from the center of the field of view to the outer limits of the field of view. A distance from the device's geographic location can also be used to define a field of view. As discussed above, a distance or range can be defined by the device in its request for search results or by the database serving the request. Only search results encompassed in this field of view will be displayed on the display.

In some embodiments, a device can also use an accelerometer to inform the device of what objects are displayed in its viewfinder. For example, if the device is in a hilly location, the accelerometer can tell the device that it is pointing downhill. In another example, the device can determine that, due to the topography surrounding its present location (described by map data) an object viewed at a certain angle from the horizon must be a neighboring hill or mountain peak in the distance. In yet another example, an angle from a horizon can indicate that the user is viewing a multiple story building having places of interest in multiple stories of the building. An accelerometer can inform the device of the angle at which the device is pointed.

Figure 3:
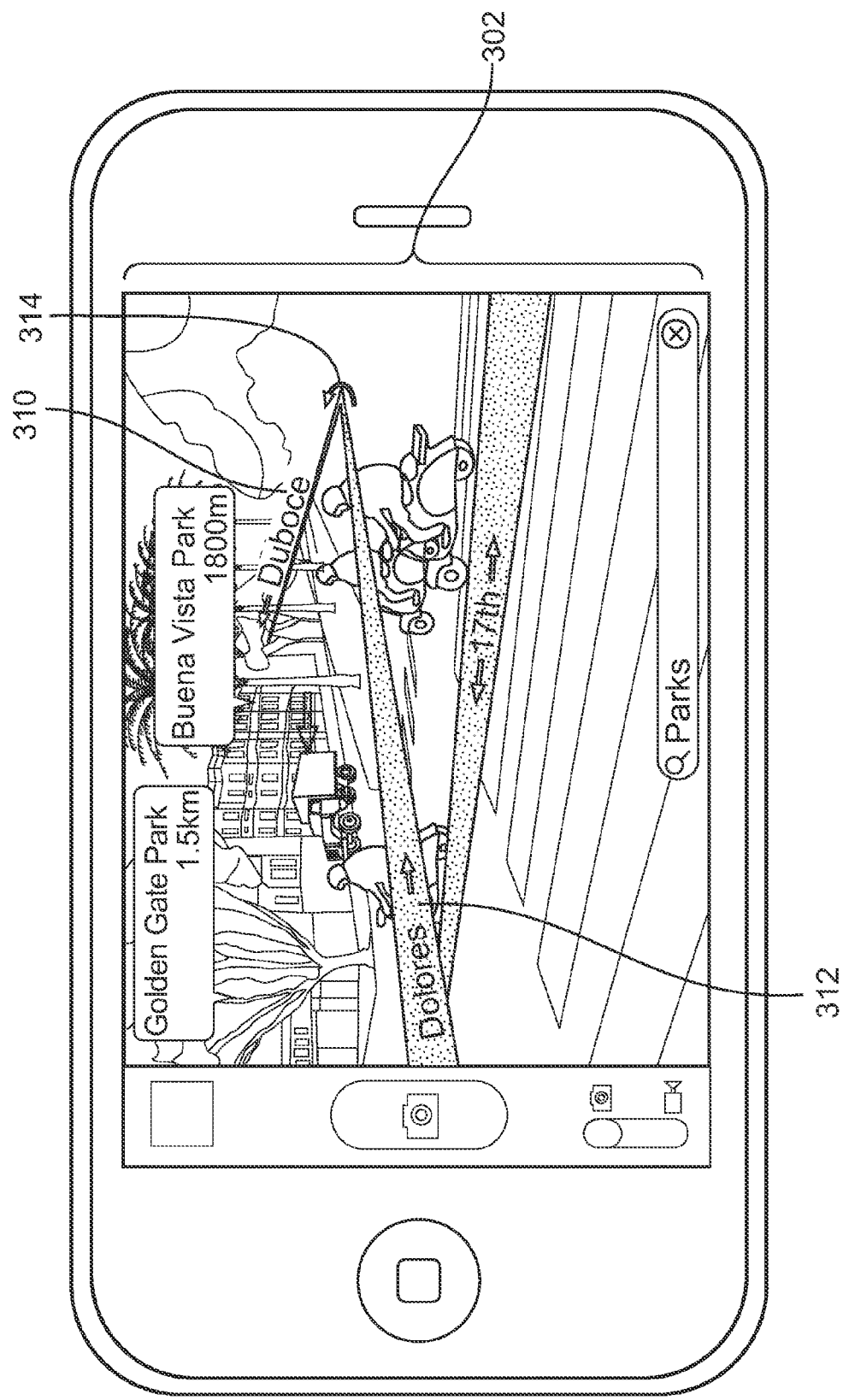
FIG. 3 illustrates an exemplary captured image visually augmented with a route to a selected point of interest.

FIG. 3 illustrates a captured image that has been visually augmented with route data to a selected point of interest. In this example, a user has selected the "Buena Vista Park" point of interest and, in response, the smart phone has visually augmented the captured image 302 with a directional map 310 to the selected point of interest, i.e., "Buena Vista Park". The route shows a direction 312 that the user must travel on Dolores St. to begin travelling to reach "Buena Vista Park." The directional map 310 further indicates a turn 314 that the user must take, i.e., a turn left onto Duboce Ave. from Dolores St. In the illustrated example, the map is shown overlaid onto Dolores St.

The route 310 guides the user with complete navigation illustrations to reach "Buena Vista Park," including any required turns. In some embodiments, the route can be represented as a schematic map, i.e., a simplified map that includes only relevant information for the user in an easy-to-read format.

A schematic map can be thought of as similar to a subway map one would see on a subway train. While the subway track itself might wind and turn, a typical subway map represents the subway route as a mostly straight line. Further, the subway map often does not have any particular scale and frequently shows every destination approximately evenly dispersed along the route. Thus, a schematic map as discussed below is one that does not adhere to geographic "reality," but rather represents map features in a schematic fashion by illustrating directions as a route made of one or more roads, trails, or ways that can be represented as substantially straight lines instead of by their actual shapes (which would be represented in a non-schematic map by adhering to geographic reality). The schematic map can also be devoid of uniform scale. Thus, in some parts of the map, such as an area of the map representing a destination, such area can be "distorted" somewhat to clearly illustrate important details, while map areas that represent portions of a route where there are no turns or other significant features can be very condensed. In short, the map can be a schematic of the real world that can provide a simple and clear representation that is sufficient to aid the user in guidance or orientation without displaying unnecessary map features or detail that could otherwise clutter a small display space.

Figure 4:
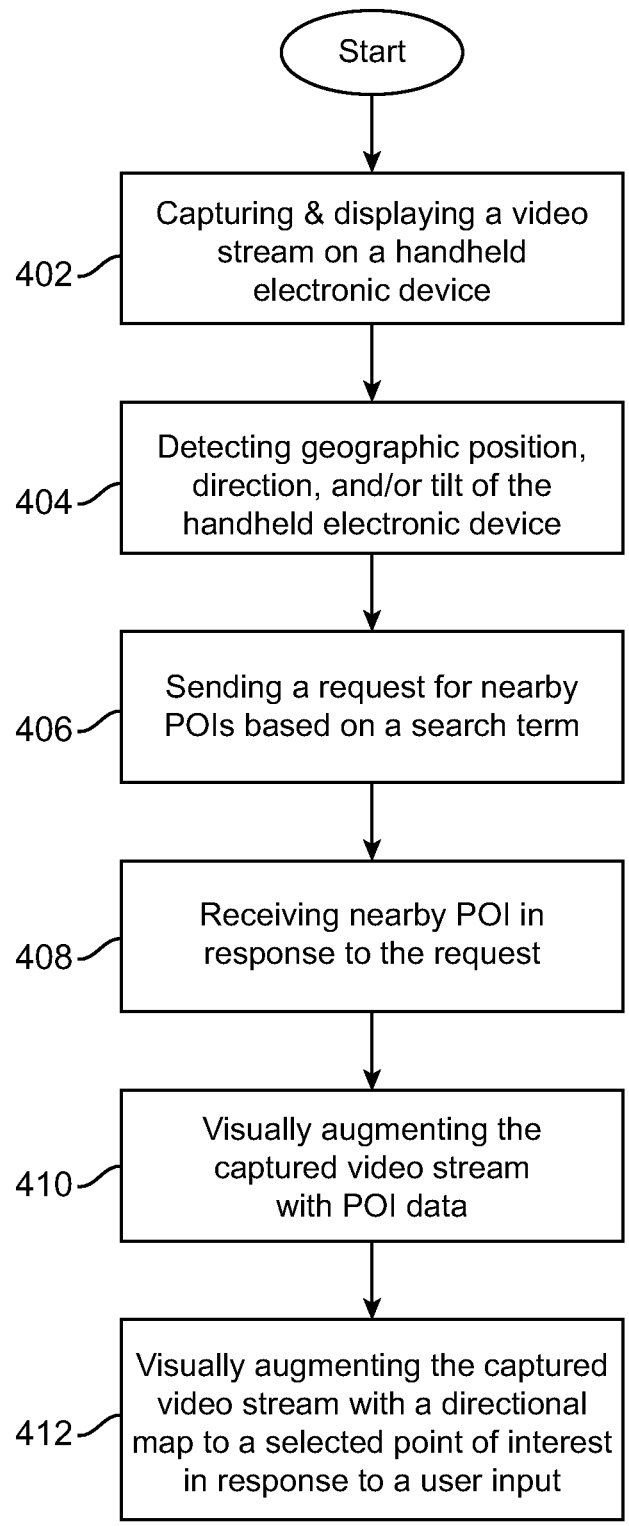
FIG. 4 is a flow chart illustrating an exemplary method of preparing and displaying an augmented reality map.

FIG. 4 is a flow chart illustrating an exemplary method of preparing and displaying an augmented reality map. As shown at block 402, the method includes capturing and displaying a video stream on a handheld communication device. Although described here in reference to a video stream, another embodiment of the disclosed technology includes capturing and displaying a single still image or a series of still images.

As shown at block 404, the method includes detecting geographic position, camera direction, and/or tilt of the handheld communication device. This allows the device to determine features, such as streets, buildings, points of interest, etc., that are within a field of view for the captured video stream.

As shown at block 406, the method includes sending a request for nearby points of interest based on one or more search terms. For example, the user can search for nearby hotels, parks, or restaurants. The request can be sent to a database located on a server that is separate from the handheld communication device and communicate via a wireless protocol. In another embodiment, the database can be stored locally on the device and the search request remains internal (sometimes termed "onboard" the device) to the handheld communication device.

In block 408, the method includes receiving nearby points of interest in response to the request. The server can filter point of interest results in one example. In this example, if the number of returned points of interest exceeds a set threshold, the server can filter the results to only return a fixed number of the best results. Various algorithms can be employed to filter points of interest to a desired number for visual augmentation of a captured video stream. In another embodiment, the handheld communication device can filter point-of-interest results received from the server for optimal display on a handheld communication device.

In block 410, the handheld communication device visually augments the captured video stream with data related to each point of interest. As shown in FIG. 2, the handheld communication device can visually augment a captured video stream with a bubble for each point of interest within the field of view for the handheld communication device. The handheld communication device determines which points of interest are within its field of view by analyzing the geographic position, camera direction, and/or tilt of the handheld communication device in concert with the known geographic position of the returned points of interest.

In block 412, the handheld communication device visually augments the captured video stream with a directional map to a selected point of interest in response to the user input. For example, as described in connection with FIG. 3, the smart phone now visually augments the captured image 302 with a directional map 310 to the selected point of interest in response to the user input. The user input can be a selection of a displayed point of interest to indicate that the user wishes to view navigation data for reaching the selected point of interest.

In some embodiments, the display can also include indicator graphics to point the user in a proper direction. For example, if the user is facing south but a route requires the user to progress north, "no route" would be shown in the display because the route would be behind him or her. In such instances, an indicator can point the user in the proper direction to find the displayed route.

In some embodiments, multiple display views can be presented based on the orientation of the device. For example, when the device is held at an angle with respect to the ground of 45 degrees to 180 degrees, the display view can present the augmented reality embodiments described herein. However, when the device is held at an angle less than 45 degrees, an illustrated or schematic view can be presented. In such embodiments, when the device is held at an angle with respect to the ground of less than 45 degrees, the device is likely pointed at the ground, where few objects of interest are likely to be represented in the displayed video. In such instances, a different map view than the augmented reality map is more likely to be useful. It should be appreciated that precise range of tilt can be adjusted according to the actual environment or user preferences.

Figure 5:
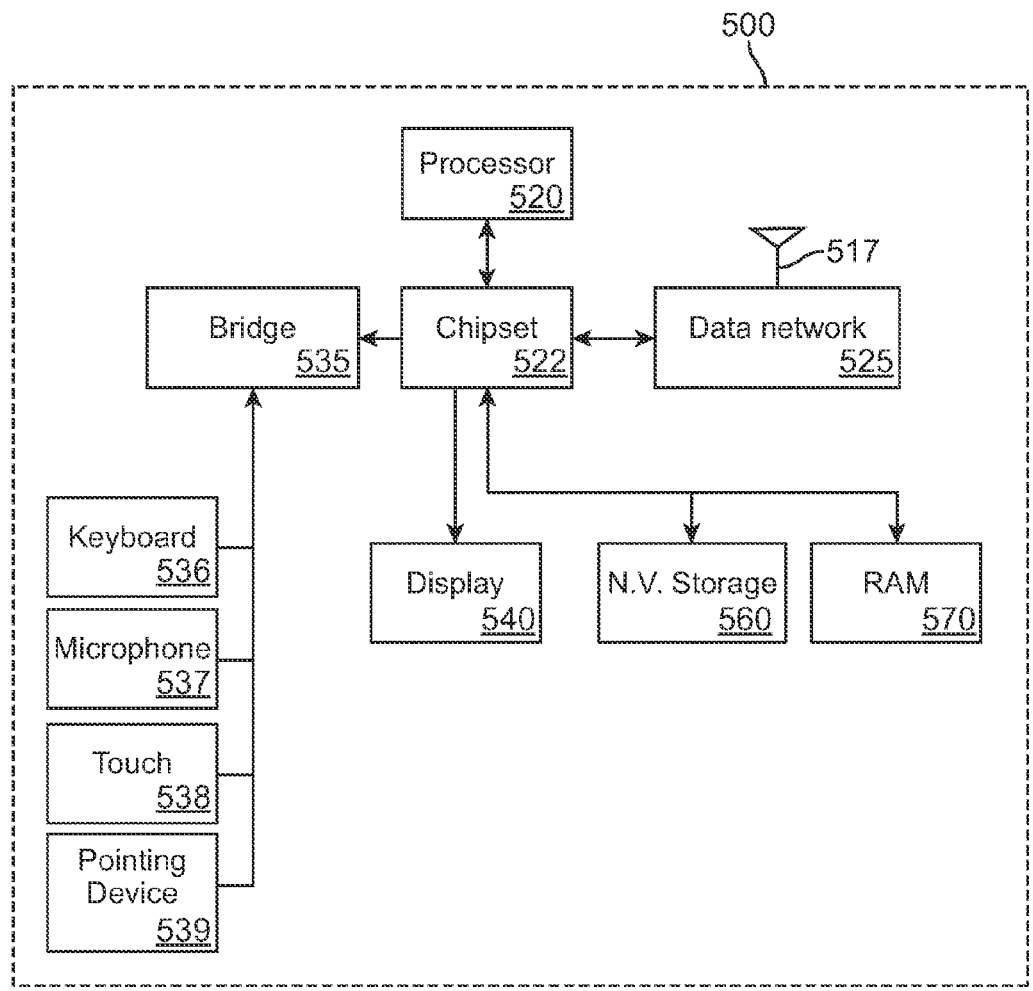
FIG. 5 is a schematic illustration of an exemplary system embodiment.

FIG. 5 illustrates a computer system 500 used to execute the described method and generate and display augmented reality maps. Computer system 500 is an example of computer hardware, software, and firmware that can be used to implement the disclosures above. System 500 includes a processor 520, which is representative of any number of physically and/or logically distinct resources capable of executing software, firmware, and hardware configured to perform identified computations. Processor 520 communicates with a chipset 522 that can control input to and output from processor 520. In this example, chipset 522 outputs information to display 540 and can read and write information to non-volatile storage 560, which can include magnetic media and solid state media, for example. Chipset 522 also can read data from and write data to RAM 570. A bridge 535 for interfacing with a variety of user interface components can be provided for interfacing with chipset 522. Such user interface components can include a keyboard 536, a microphone 537, touch-detection-and-processing circuitry 538, a pointing device such as a mouse 539, and so on. In general, inputs to system 500 can come from any of a variety of machine-generated and/or human-generated sources.

Chipset 522 also can interface with one or more data network interfaces 525 that can have different physical interfaces 517. Such data network interfaces can include interfaces for wired and wireless local area networks, for broadband wireless networks, as well as personal area networks. Some applications of the methods for generating and displaying and using the augmented reality user interface disclosed herein can include receiving data over physical interface 517 or be generated by the machine itself by processor 520 analyzing data stored in memory 560 or 570. Further, the machine can receive inputs from the user via devices keyboard 536, microphone 537, touch device 538, and pointing device 539 and execute appropriate functions, such as browsing functions by interpreting these inputs using processor 520.

While FIG. 5 illustrates an example of a common system architecture, it should also be appreciated that other system architectures are known and can be used with the present technology. For example, systems wherein most or all of the components described within FIG. 5 can be joined to a bus, or the peripherals could write to a common shared memory that is connected to a processor or a bus can be used. Other hardware architectures are possible and such are considered to be within the scope of the present technology.

Figure 6:
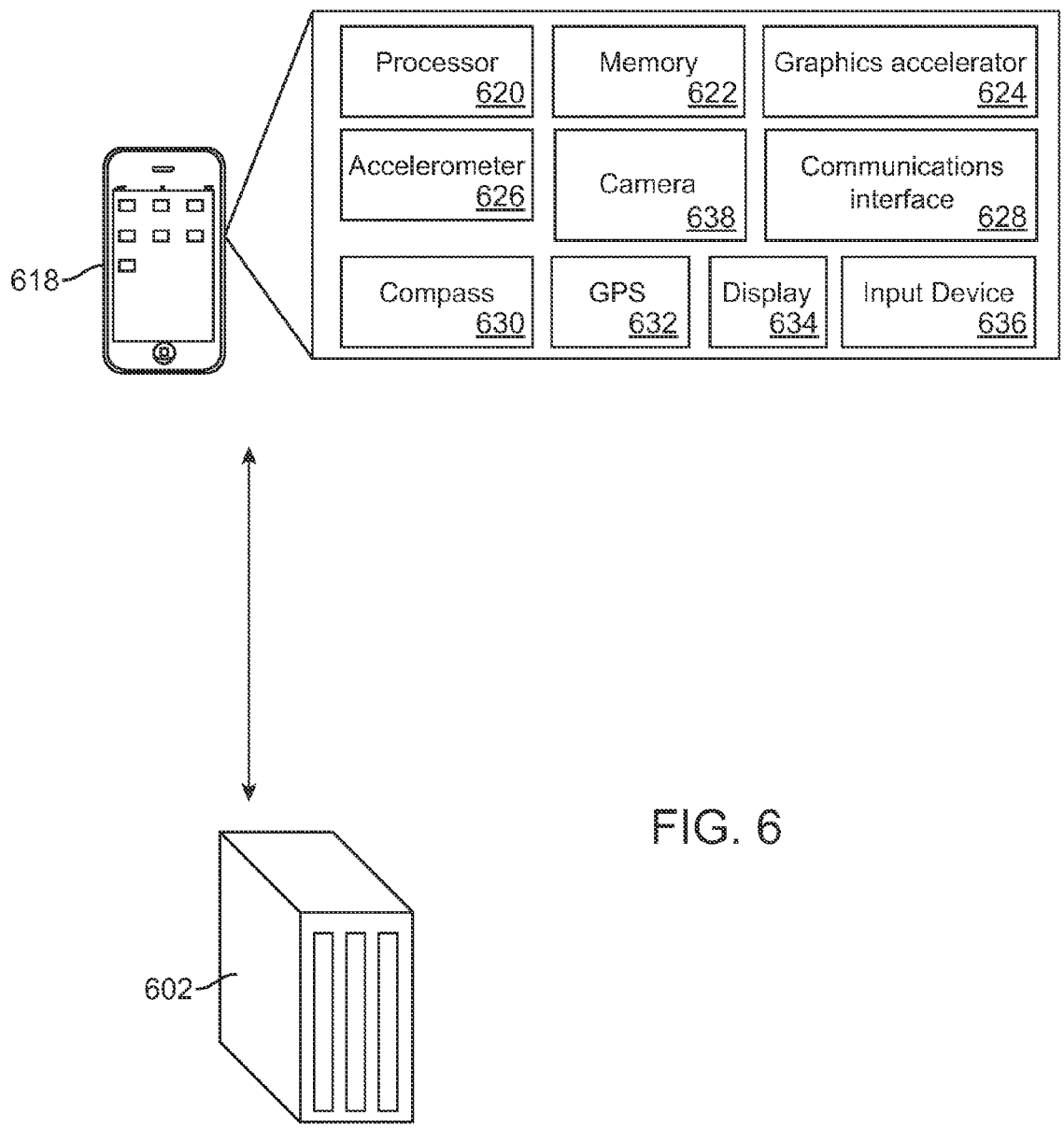
FIG. 6 is a schematic illustration of an exemplary system embodiment.

FIG. 6 illustrates an exemplary system embodiment. A server 602 is in electronic communication with a handheld communication device 618 having functional components such as a processor 620, memory 622, graphics accelerator 624, accelerometer 626, communications interface 628, compass 630, GPS 632, display 634, input device 636, and camera 638. None of the devices are limited to the illustrated components. The components may be hardware, software, or a combination of both.

In some embodiments, the server can be separate from the handheld communication device. The server and handheld communication device can communicate wirelessly, over a wired-connection, or through a mixture of wireless and wired connections. The handheld communication device can communicate with the server over a TCP/IP connection. In another embodiment, the handheld communication device can be directly connected to the server. In another embodiment, the handheld communication device can also act as a server and store the points of interest locally.

In some embodiments, instructions are input to the handheld electronic device 618 through an input device 636 that instructs the processor 620 to execute functions in an augmented reality application. One potential instruction can be to generate an augmented reality map of travel directions to a point of interest. In that case, the processor 620 instructs the camera 638 to begin feeding video images to the display 634. In some embodiments, video images recorded by the camera are first sent to graphics accelerator 624 for processing before the images are displayed. In some embodiments, the processer can be the graphics accelerator. The image can be first drawn in memory 622 or, if available, memory directly associated with the graphics accelerator 624.

The processor 620 can also receive location and orientation information from devices such as a GPS device 632, communications interface 628, digital compass 630 and accelerometer 626. The GPS device can determine GPS coordinates by receiving signals from Global Positioning System (GPS) satellites and can communicate them to the processor Likewise, the processor can determine the location of the device through triangulation techniques using signals received by the communications interface 628. The processor can determine the orientation of the device by receiving directional information from the digital compass 620 and tilt information from the accelerometer.

The processor can also direct the communications interface to send a request to the server 602 for map data corresponding to the area surrounding the geographical location of the device. In some embodiments, the processor can receive signals from the input device, which can be interpreted by the processor to be a search request for map data including features of interest.

The processor can interpret the location and orientation data received from the accelerometer 626, compass 630, or GPS 632 to determine the direction in which the camera 638 is facing. Using this information, the processor can further correlate the location and orientation data with the map data and the video images to identify objects recorded by the camera 638 and displayed on the display 634.

The processor can receive other inputs via the input device 636 such as an input that can be interpreted as a selection of a point of interest displayed on the display 634 and a request for directions. The processor 620 can further interpret the map data to generate and display a route over the displayed image for guiding the user to a destination (selected point of interest).

As the user follows the specified direction to the selected points of interest, the processor can continue to receive updated location and directional information and video input and update the overlaid route.

Methods according to the above-described examples can be implemented using computer-executable instructions that are stored or otherwise available from computer-readable media. Such instructions comprise, for example, instructions and data which cause or otherwise configure a general-purpose computer, a special-purpose computer, or a special-purpose processing device to perform a certain function or group of functions. Portions of computer resources used can be accessible over a network. The computer-executable instructions may be, for example, binaries, intermediate format instructions such as assembly language, firmware, or source code. Examples of computer-readable media that may be used to store instructions, information to be used, and/or information created during methods according to described examples include magnetic or optical disks, flash memory, USB devices provided with non-volatile memory, networked storage devices, and so on.

Devices implementing methods according to this disclosure can comprise hardware, firmware, and/or software and can take any of a variety of form factors. Typical examples of such form factors include laptops, smart phones, small-form-factor personal computers, personal digital assistants, and so on. Functionality described herein also can be embodied in peripherals or add-in cards. Such functionality also can be implemented on a circuit board among different chips or different processes executing in a single device, by way of further example.

The instructions, media for conveying such instructions, computing resources for executing them, and other structures for supporting such computing resources are means for providing the functions described in this disclosure.

Although a variety of examples and other information have been used to explain various aspects within the scope of the appended claims, no limitation of the claims should be implied based on particular features or arrangements in such examples, as one of ordinary skill would be able to use these examples to derive a wide variety of implementations. Furthermore, and although some subject matter may have been described in language specific to examples of structural features and/or method steps, it should be understood that the subject matter defined in the appended claims is not necessarily limited to those described features or acts. For example, functionality of the various components can be distributed differently or performed in components other than those identified herein. Therefore, the described features and steps are disclosed as examples of components of systems and methods that are deemed to be within the scope of the following claims.

The invention claimed is:

1. A method implemented on a handheld communication device having a processor, an image capture device, and a display, the method comprising:
presenting a captured image on the display, the image being captured by the image capture device;
detecting a geographic position of the handheld communication device and a camera direction of the image capture device;
determining a tilt orientation of the handheld communication device;
determining a field of view based on the geographic position, the tilt orientation, and the camera direction;
processing map data describing streets, buildings, and points of interest near the geographic position of the device;
identifying one or more points of interest that are:
within the field of view;
within a certain distance of the geographic position; and
obstructed in the captured image;
visually augmenting the captured image with an indication of each of the one or more identified points of interest;
further processing the map data to generate a route from the geographic position of the device to a selected point of interest, the selected point of interest being one of the one or more identified points of interest; and
overlaying an illustration representing at least a portion of the route from the geographic position to the selected point of interest on the captured image by correlating the map data describing the route from the geographic position and the field of view of the image capture device to match objects depicted in the captured image with objects described by the map data.

2. The method of claim 1, further comprising:
requesting, from a server, the map data describing an area surrounding the geographic position of the device.

3. The method of claim 1, further comprising:
searching for places of interest fitting a description that has been input by a user using an input device.

4. The method of claim 1, further comprising:
receiving inputs from a touch screen device effective to select a point of interest and generate and display the route to the point of interest.

5. The method of claim 1, wherein the route is overlaid over streets in the captured image.

6. The method of claim 1, wherein turn arrows are overlaid onto the captured image to indicate upcoming turns in the route as the user travels along the route.

7. The method of claim 1, wherein a point of interest outside the field of view is not visually augmented.

8. The method of claim 1, further comprising:
in response to determining that the tilt orientation of the handheld communication device relative to a horizontal axis has changed, presenting a schematic map with route information for the route from the geographic position to the selected point of interest on the display instead of the captured image.

9. The method of claim 8, wherein the schematic map is presented in response to determining that the tilt orientation indicates that the handheld communication device is tilted such that the image capture device is substantially facing the ground.

10. The method of claim 8, wherein the schematic map is presented when the tilt orientation indicates that the handheld communication device is tilted at an angle less than 45 degrees from the ground.

11. The method of claim 1, wherein the field of view extends a certain range beyond visible objects in the captured image.

12. A system comprising:
a video capture device configured to capture video images;
a global positioning system device (GPS device) configured to determine GPS coordinates identifying the location of the video capture device;
a digital compass configured to determine a camera direction of the video capture device;
an accelerometer for determining a tilt orientation of the video capture device, the tilt orientation being relative to one or more of a horizontal axis and a vertical axis;
a server for receiving and servicing requests for map data for areas surrounding the GPS location identified by the GPS device, the map data being descriptive of features such as places, roads, buildings, and points of interest;
a general-purpose processor in digital communication with the video capture device, the GPS device, the digital compass, a graphics processor, and a display, the general-purpose processor configured to:
correlate features represented in a video image captured by the video capture device with the same features as represented by the map data, the correlating being accomplished by using the GPS location, the tilt orientation, and the camera direction to determine a field of view and to match a feature within the field of view with the feature as represented in the map data, and
identify one or more points of interest that are:

within the field of view;
within a certain distance of the GPS location; and
obstructed in the video image;
the graphics processor configured to:
overlay, on the video image, map data representing each of the one or more identified points of interest and an illustrated portion of a route from the GPS location identified by the GPS device to a selected one of the identified points of interest, the route being determined based on the map data; and
update the illustrated portion of the route as the GPS location of the video capture device changes with movement along the route; and
the display configured to present the video image that has been overlaid.

13. The system of claim 12, wherein the display is a touch screen for accepting inputs from the user effective to enter into the general-purpose processor, search terms used to define a request for a point of interest.

14. The system of claim 13, wherein the touch screen display further displays points of interest returned from the search that are within the field of view and accepts inputs from the user to select a point of interest from the points of interest, the selection of a point of interest causing the communications interface to request a route to the point of interest from a map database.

15. The system of claim 12, wherein the display changes from presentation of the captured video images with the portion of the route overlaid to display of a schematic map with route information for the route in response to determining that the tilt orientation of the video capture device relative to the horizontal axis has changed and indicates that the image capture device is substantially facing the ground.

16. The system of claim 15, wherein the display changes in response to determining that the tilt orientation indicates that the image capture device is at an angle less than 45 degrees from the ground.

17. The system of claim 12, wherein the general-purpose processor also uses the tilt orientation to match the location of the object as represented in the map data with its position in reality as captured in video.

18. The system of claim 12, wherein map data representing uncorrelated features are not presented on the display.

19. A product, comprising:
an image capture device;
a display;
a processor;
a non-transitory computer-readable medium; and
computer-executable instructions on the non-transitory computer-readable medium for causing the processor to perform a method comprising:
presenting a captured image on the display;
detecting a geographic position, a camera direction of the image capture device, and a tilt orientation of the image capture device, the tilt orientation being relative to one or more of a horizontal axis and a vertical axis;
determining a field of view from the geographic position, the camera direction, and the tilt orientation;
sending a search request to a server for nearby points of interest that are:
within the field of view;
within a certain distance of the geographic position; and
obstructed in the captured image;
receiving points of interest in response to the search request;
visually augmenting the captured image with an indication of each point of interest by correlating the location of each point of interest to a location relative to the captured image; and
visually augmenting the captured image with an illustrated route from the geographic position to a selected point of interest in response to a user input.

20. The product of claim 19, wherein the method further comprises filtering the received points of interest before visually augmenting the captured image.

21. The product of claim 19, wherein the method further comprises augmenting the captured image with a turn indication corresponding to turns in the route.

22. The product of claim 19, wherein the method further comprises overlaying the illustrated route onto the displayed streets.

23. The product of claim 19, wherein the schematic map is presented in response to determining that the tilt orientation indicates that the image capture device is substantially facing the ground.

24. The product of claim 19, wherein the schematic map is presented in response to determining that the tilt orientation indicates that the image capture device is tilted at an angle less than 45 degrees from the ground.

25. A handheld communication device, comprising:
an image capture device for recording an image, the image including visible objects and the image capture device having a field of view of a limited angle;
a global positioning system device (GPS device) for determining GPS coordinates for a present location of the handheld communication device;
a digital compass for detecting a camera direction of the handheld communication device;
an accelerometer for detecting a tilt orientation of the handheld communication device relative to one or more of a horizontal axis and a vertical axis;
a communications interface for requesting and receiving map information data for an area surrounding the present location of the handheld communication device, the map information data including points of interest from search results for a requested category of interest;
a processor configured to determine:
the field of view based on the present location, the tilt orientation, and the camera direction; and
at least one point of interest from the received points of interest that is obstructed in the recorded image and is within the field of view when the field of view is extended a certain range beyond the visible objects; and
a touch screen display for displaying the recorded image and an indication of the at least one point of interest within the field of view and accepting a user input selecting a point of interest from the at least one point of interest,
wherein the processor is configured to:
respond to the user input to cause the handheld communication device to request and receive directions forming a route from the present GPS coordinates to the selected point of interest; and
cause the touch screen display to display a portion of the route from the present GPS coordinates to the selected point of interest overlaid onto the recorded image.

26. The handheld communication device of claim 25, wherein the processor instructs the touch screen display to change from display of the recorded image with the portion of the route overlaid to displaying a schematic map with route information for the route from the present GPS coordinates to the selected point of interest in response to determining that the tilt orientation of the handheld communication device relative to the horizontal axis has changed and indicates that the image capture device is substantially facing the ground.

27. The handheld communication device of claim 25, wherein the processor is further configured to cause the touch screen display to present indicator arrows indicating that a point of interest is outside the field of view.

28. The handheld communication device of claim 25, wherein the processor is further configured to use the tilt orientation to determine what objects are in the recorded image.

29. The handheld communication device of claim 25, wherein points of interest not within the field of view are not displayed on the touch screen display.

* * * * *